United States Patent [19]
Davis

[11] Patent Number: 6,000,453
[45] Date of Patent: Dec. 14, 1999

[54] APPARATUS FOR CONTROLLING THICKNESS DURING LAY-UP AND FABRICATION OF PRESS-CURED COMPOSITE ARTICLES

[75] Inventor: Geoffrey C. R. Davis, Madison, Conn.

[73] Assignee: Sikorsky Aircraft Corporation, Stratford, Conn.

[21] Appl. No.: 09/037,532

[22] Filed: Mar. 10, 1998

Related U.S. Application Data

[62] Division of application No. 08/626,771, Mar. 29, 1996, Pat. No. 5,759,325.

[51] Int. Cl.$^6$ ..................................................... B32B 31/00
[52] U.S. Cl. ..................... 156/382; 156/580; 156/583.3; 425/503; 425/504; 425/405.2
[58] Field of Search ..................................... 156/382, 580, 156/583.3, 154, 285, 307.7; 425/503, 504, 405.2, 405.1, 520, 515; 264/510, 511, 258, 259, 162, 241, 513

[56] References Cited

U.S. PATENT DOCUMENTS

| | | | |
|---|---|---|---|
| 3,553,054 | 1/1971 | Maus | 156/382 |
| 3,666,600 | 5/1972 | Yoshino | 156/382 |
| 3,939,024 | 2/1976 | Hoggatt . | |
| 4,065,340 | 12/1977 | Dickerson . | |
| 4,624,820 | 11/1986 | Barraclough . | |
| 4,869,770 | 9/1989 | Christensen et al. | 156/382 X |
| 5,116,216 | 5/1992 | Cochran et al. | 425/504 |
| 5,372,479 | 12/1994 | Byrnes et al. . | |
| 5,431,538 | 7/1995 | Schmaling et al. . | |
| 5,433,915 | 7/1995 | Yamamoto et al. . | |

FOREIGN PATENT DOCUMENTS

| | | |
|---|---|---|
| 0 319 895 A2 | 6/1986 | European Pat. Off. . |
| 34 45 462 A1 | 10/1985 | Germany . |

*Primary Examiner*—Jeff H. Aftergut
*Attorney, Agent, or Firm*—Terrance J. Radke

[57] ABSTRACT

A method and apparatus for controlling the thickness of press-cured composite articles during the manufacture thereof. The method includes a preparatory or prefabrication stage wherein prepreg plies are layed up and compacted to form a plurality of laminates that define a final laminate package that defines the uncured configuration of the composite article. The final laminate package may include supplemental ply-packs layed up at the mid-plane or neutral axis of the final laminate package for the purpose of controlling the overall thickness of the final laminate package. The prepreg plies layed up in the preparatory stage have been precut to conform to the final net shape of the composite article, but include a predetermined overbuild in the width dimension to facilitate control of thickness during cure of the final laminate package. The method further includes a fabrication stage wherein a deformable, back-pressure system is abutted in combination with the final laminate package, which is then subjected to a cure cycle to form the press-cured composite article. The deformable, back-pressure system is controllably deformed during the cure cycle to control and limit the lateral expansion of the final laminate package. The deformable, back-pressure system also prevents fiber washout during the cure cycle.

7 Claims, 5 Drawing Sheets

APPARATUS FOR CONTROLLING THICKNESS DURING LAY-UP AND FABRICATION OF PRESS-CURED COMPOSITE ARTICLES

RELATED APPLICATION

The instant application is a divisional application of U.S. patent application Ser. No. 08/626,771, filed Mar. 29, 1996, and entitled A METHOD AND APPARATUS FOR CONTROLLING THICKNESS DURING LAY-UP AND FABRICATION OF PRESS-CURED COMPOSITE ARTICLES now U.S. Pat. No. 5,759,325.

The Government has rights in this invention pursuant to Contract No. DAAJ09-91-C-A004 awarded by the Department of the Army.

TECHNICAL FIELD

The present invention relates to methods and apparatus for manufacturing composite articles, and more particularly, to a method and apparatus for controlling thickness during lay-up and fabrication of press-cured composite articles. The present method and apparatus has particular utility in controlling the thickness of press-cured composite flexbeams for helicopters.

BACKGROUND ART

There is a continuing expansion of the use of composite materials for a diverse array of applications. In particular, the use of composite materials in the aerospace field is continually expanding because of the strength-to-weight advantage provided by composite materials as opposed to metallic materials.

In using composite materials to manufacture articles, particular attention must be devoted to the design and implementation of the manufacturing process for the particular composite article to be manufactured. A primary consideration in the design and implementation of a manufacturing process for composite articles in the aerospace field is that such process must produce composite articles, on a repeatable basis, with minimal deviations with respect to the one or more of the design dimensions, i.e., thickness, width, length. Out-of-tolerance deviations with respect to one or more of the design dimensions may adversely affect the structural utility of the composite article, e.g., inability to integrate such an out-of-tolerance composite article in combination with adjacent components, but, even more importantly, out-of-tolerance deviations with respect to one or more design dimensions may adversely affect the design response characteristics of the composite article. This is a particularly important consideration with respect to the manufacture of composite articles for use in the aerospace field.

For example, the use of composite flexbeams in a helicopter main rotor assembly is becoming ever more commonplace. Representative examples of composite flexbeams are described in U.S. Pat. No. 5,431,538 (A Hybrid Composite Flexbeam for a Helicopter Bearingless Main Rotor Assembly) and U.S. Pat. No. 5,372,479 (A Flexbeam for a Helicopter Bearingless Main Rotor Assembly). A composite flexbeam for use in combination with a bearingless main rotor (BMR) assembly must have design dimensions that meet demanding tolerance specifications so that the design response characteristics of such composite flexbeams accommodate the bending strain, shear stress, buckling, and frequency conditions experienced during critical loading, i.e., flapwise, chordwise, torsional, and centrifugal loads, as a result of operation of the BMR assembly. The critical loading conditions include start up and shut down, which generate low-cycle, high-strain flapwise and chordwise loads, and forward flight conditions, which can generate high-cycle, high-strain loads such as 1 cycle/rev oscillatory flap and torsional displacements.

With respect to the criticality of the design dimensions of composite flexbeams, for example, a composite flexbeam must possess a certain minimum cross section to transmit the main rotor blade centrifugal loads into the rotor hub assembly. Conversely, however, the thickness of the composite material(s) comprising the composite flexbeam must be minimized to ensure that maximum allowable torsion shear strain limits are not exceeded. Flapwise and chordwise loads require additional material in the flexbeam to accommodate bending stresses. Such additional material, however, increases flexbeam stiffness, causing increased hinge offset. For a soft inplane rotor design, the chordwise flexbeam stiffness is governed by the need to establish the rotor chordwise frequency at about 0.7 cycle/rev. If the flexbeam is too compliant in chordwise flexibility, the BMR assembly is more susceptible to aeromechanical and structural instability. If the flexbeam is too stiff, however, chordwise loads will increase because of 1 cycle/rev resonance. The torsional stiffness of the pitch section should be minimized to keep pitch actuator requirements to a minimum. In contradistinction, however, the torsional stiffness of the pitch section must be sufficiently high to ensure buckling stability under edgewise loading.

Thus, it is evident that the design response characteristics of composite flexbeams are inextricably linked to, and dependent upon, the design dimensions of such composite flexbeams. Therefore, a process for manufacturing composite flexbeams must be designed to ensure that the finished composite flexbeams meet or exceed, on a repeatable basis, the demanding tolerance specifications delimited for the design dimensions of such composite flexbeams.

DISCLOSURE OF THE INVENTION

One object of the present invention is to provide a method for precisely controlling thickness in a press-cured composite article.

Another object of the present invention is to provide a method for precisely controlling thickness in a press-cured composite article that includes a preparatory stage wherein a number of supplemental ply-packs are layed up in combination with an intermediate laminate package to control thickness during the preparatory stage.

A further object of the present invention is to provide a method for precisely controlling thickness in a press-cured composite article that includes a fabrication stage wherein a deformable, back-pressure system is installed in combination with a final laminate package to control thickness during the fabrication stage.

These and other objects of the present invention are achieved by means of a method for controlling thickness during lay-up and fabrication of a press-cured composite article that includes a preparatory stage and a fabrication stage. The preparatory stage comprises the steps of assembling a preparatory molding assembly that includes a base mold member, laying up a plurality of prepreg plies onto the base mold member of the preparatory molding assembly wherein the layed-up prepreg plies define a laminate, vacuum compacting the plurality of prepreg plies layed-up in the preparatory molding assembly, repeating the prepreg ply lay-up step and the autoclave compacting step as required to form an intermediate laminate package comprising a plurality of layed-up laminates, autoclave compacting the intermediate laminate package, laying up a number of supplemental ply-packs in combination with the autoclave-compacted intermediate laminate package, and repeating the prepreg ply lay-up step, the vacuum compacting step, and the autoclave compacting step as required to form an autoclave-compacted final laminate package.

The fabrication stage of the method comprises the steps of disassembling the preparatory molding assembly to expose the autoclave-compacted final laminate package on the base mold member, installing a deformable, back-pressure system in abutting combination with the autoclave-compacted final laminate package, reconfiguring the base mold member containing the autoclave-compacted final laminate package to form a fabrication molding assembly, subjecting the autoclave-compacted final laminate package in the fabrication molding assembly to a cure cycle in a heated platen press to form the press-cured composite article, and disassembling the fabrication molding assembly to remove the press-cured composite article therefrom.

BRIEF DESCRIPTION OF THE DRAWINGS

A more complete understanding of the present invention and the attendant features and advantages thereof may be had by reference to the following detailed description when considered in conjunction with the following drawings wherein:

FIG. 3F illustrates the position of the fabrication molding assembly due to the application of the nominal closure force exerted by the heated platen press used in the fabrication stage of a method according to the present invention.

BEST MODE FOR CARRYING OUT THE INVENTION

Figure 1:
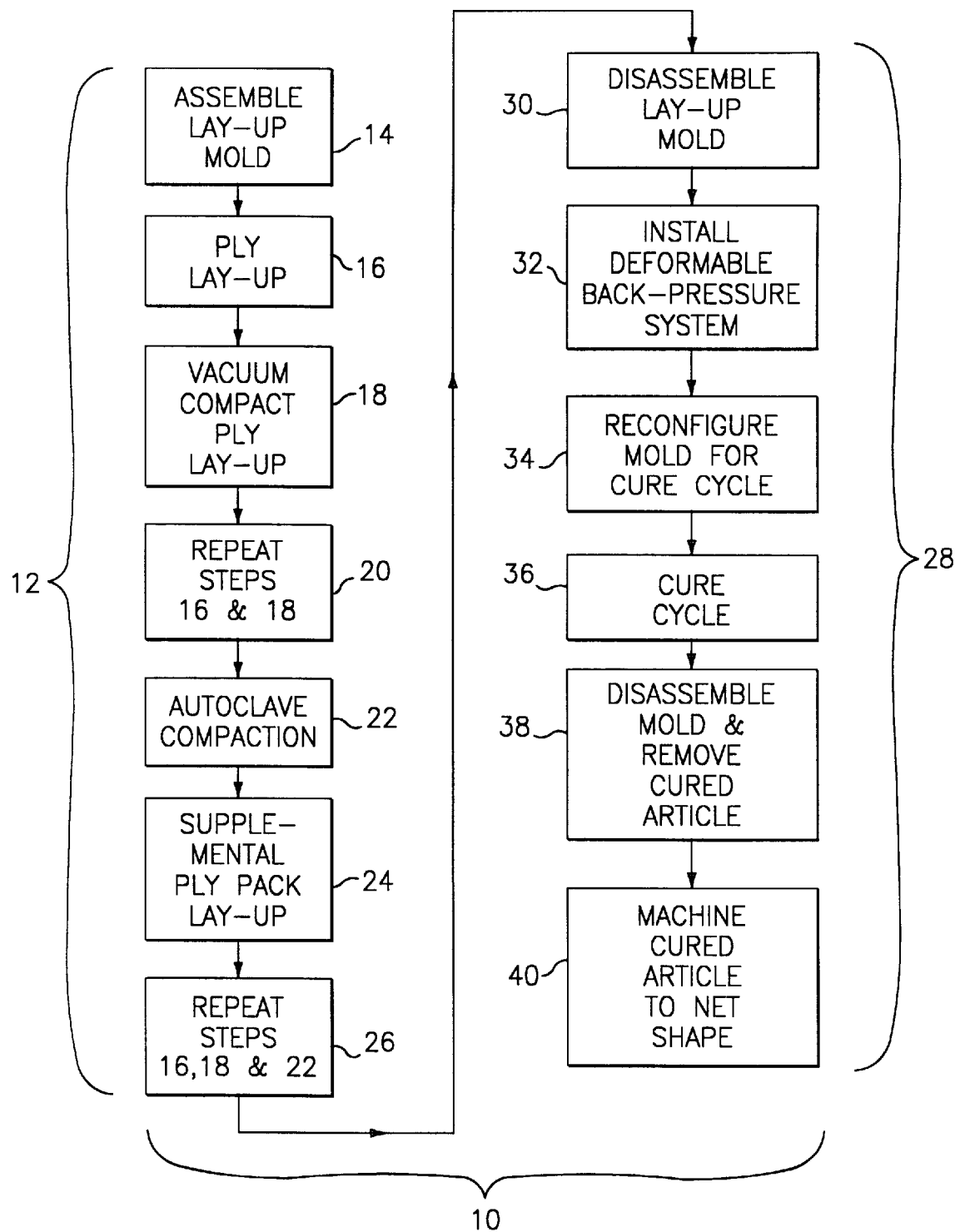
FIG. 1 is a schematic diagram illustrating the steps comprising the method according to the present invention.

A method according to the present invention for controlling the thickness of press-cured composite articles is described hereinbelow. The method controls thickness both during a preparatory or prefabrication stage wherein prepreg plies are layed up to form a final laminate package (see FIG. 3C) that defines the uncured configuration of the composite article to be manufactured and during a fabrication stage wherein a deformable, back-pressure system is abutted in combination with the final laminate package which is then cured to form a cured composite article. The method facilitates the manufacture, on a repeatable basis, of complex composite articles having minimal deviations in thickness. The method makes it practical and economical to lay up and press cure thick composite articles utilizing prepreg plies that exhibit significant per ply thickness variations. The fabrication stage of the method according to the present invention accommodates thickness variations of approximately five percent in the prepreg plies used in the method, and the process controls implemented in the preparatory stage of the method according to the present invention accommodate thickness variations of approximately twelve percent in the prepreg plies used in the method such that overall, the method is capable of accommodating thickness variations of approximately seventeen percent in the prepreg plies used in the method of the present invention.

The method according to the present invention is designed for use with prepreg materials. Prepreg materials are composite materials that are formed by embedding yarns, fibers, or fiber tows of a reinforcing material, e.g., fiberglass or graphite, in a predetermined amount of organic resin, e.g., epoxy resin, and staging and drying the fiber-reinforced organic resin matrix to form a partially cured, i.e., "tacky", composite material, i.e., prepreg sheets or tape, that are subsequently packaged in protective film. For example, prepreg sheets or tapes can be formed by a hot melt resin process wherein the organic resin is heated, the heated organic resin is extruded into a film, the extruded organic resin film is infused with fibrous reinforcement material while hot, and the fiber-reinforced. extruded organic resin film is cooled to form the tacky composite material. The prepreg sheets or tape in the tacky condition are handled and processed in all operations comprising the preparatory stage of the method according to the present invention.

The prepreg plies used in the embodiment of the method according to the present invention, as described hereinbelow in further detail, are formed from "unidirectional" prepreg sheets or tape. Unidirectional is used herein in the sense that the fibers embodied in the prepreg sheets or tape have a defined fiber orientation, e.g., 0°, 90°, +45°, −45°. The fiber orientation is defined with respect to a specific axis of the composite article being fabricated. For example, in U.S. Pat. Nos. 5,431,538 and 5,372,479 the fiber orientation of the composite material used in fabricating the composite flexbeams described therein is defined with respect to the span axis of the composite flexbeams (see reference character $S_R$ in FIG. 2B). Unidirectional as used herein also encompasses prepreg sheets or tape formed with woven fibrous material as the reinforcing element wherein approximately 90–95% of the fibers of the woven material have the defined fiber orientation and the remaining 5–10% of the fibers are orthogonal to the defined fiber orientation. These orthogonal fibers provide improved stability when handling and processing prepreg sheets or tape formed from such woven material (versus prepreg sheets or tapes wherein all the reinforcing fibers have only the defined fiber orientation).

Original equipment manufacturers such as Sikorsky Aircraft, the Assignee of the present invention, that manufacture composite articles, e.g., a helicopter flexbeam as described hereinbelow, in the course of producing an end product generally purchase prepreg sheets or tapes in bulk lots from independent vendors that have experience in fabricating such prepreg sheets or tapes. Each prepreg sheet or tape provided by a vendor is accompanied by a certification that such prepreg sheet or tape(and concomitantly, any prepreg plies cut therefrom) has a specified nominal thickness after cure. However, such prepreg sheets or tapes may have variations in material thickness of up to approximately ±8% of the nominal certified cured thickness. Variations in material thickness among individual prepreg sheets or tapes are due to deviations in fiber yield, imperfect fiber interaction (e.g., non-conforming nesting among embedded/infused reinforcement fibers), deviations in resin content, and/or entrapped air of the respective individual prepreg sheets or tapes.

Prepreg plies having defined configurations for use in the method of the present invention are formed by precutting such defined configurations from the prepreg sheets or tapes (see also further discussion hereinbelow on the configuration of the prepreg plies with respect to the width dimension thereof). Precutting is typically accomplished using a numerically controlled ply cutter as is well known in the art. One skilled in the art will appreciate that the number and required configurations of the prepreg plies will depend on the configuration and complexity of the composite article to be manufactured.

Figure 2A:
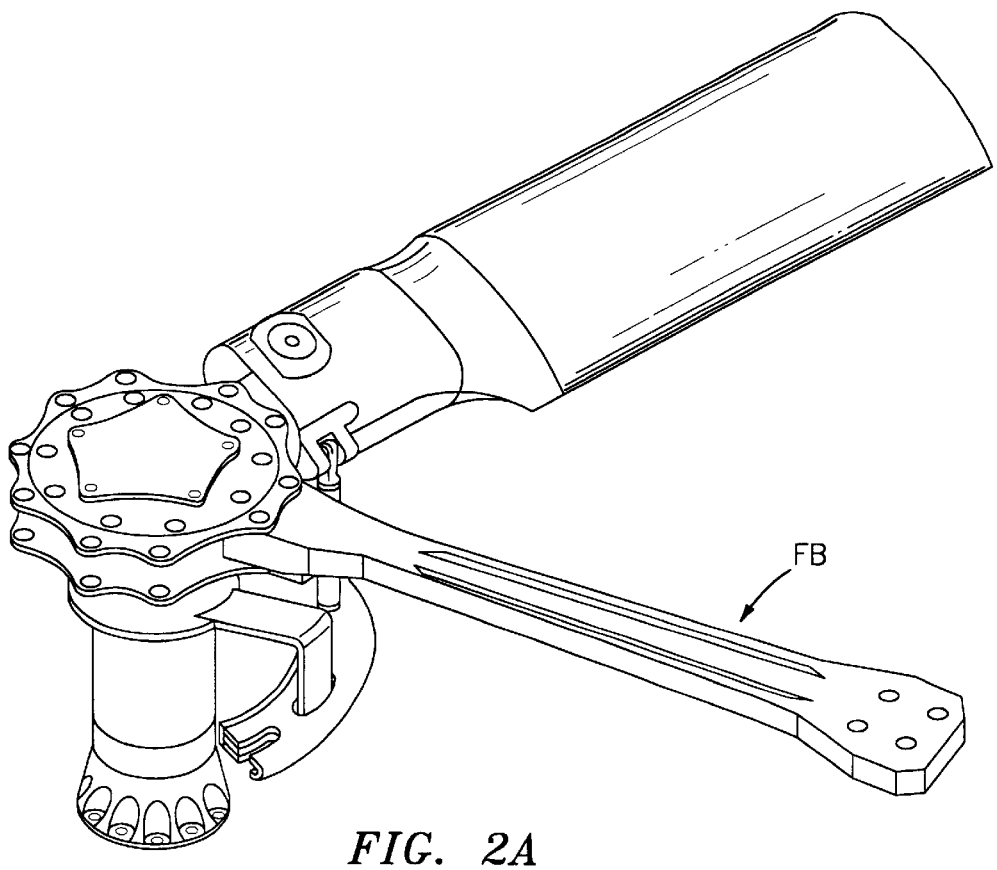
FIGS. 2A, 2B illustrate a hybrid composite flexbeam for a helicopter that is fabricated using the method of the present invention.
Figure 2B:
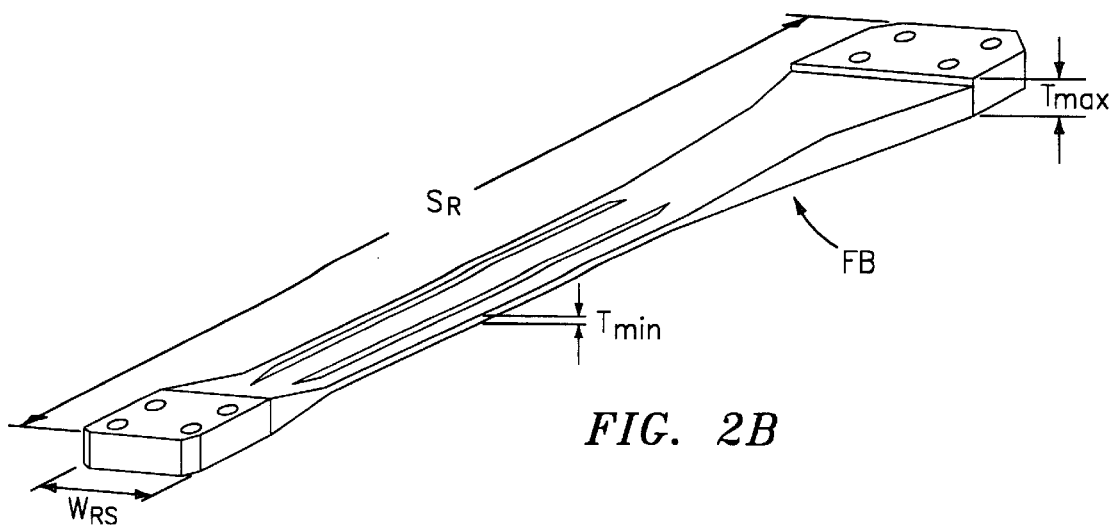

The method and apparatus according to the present invention are described herein in terms of the manufacture of a hybrid composite flexbeam FB for a helicopter as illustrated in FIGS. 2A, 2B. The hybrid composite flexbeam FB for the Comanche helicopter is a very complex composite article, comprising an admixture of over 800 fiberglass and graphite prepreg plies. As an examination of FIG. 2B reveals, the design thickness of the composite flexbeam FB varies significantly over the radial span SR thereof, from a minimum thickness $T_{min}$ in the pitch region of the composite flexbeam FB to a maximum thickness $T_{max}$ in the hub attachment region. For the Comanche composite flexbeam FB, $T_{min}$ is approximately 0.76 centimeters (0.3 inches) while $T_{max}$ is approximately 6.35 centimeters (2.5 inches) such that the design thickness of the composite flexbeam FB has a spanwise thickness distribution ratio of approximately 8.3:1.

The stiffness of the composite flexbeam FB varies as a cubed function of the design thickness of the composite flexbeam FB for the primary flexural mode of the composite flexbeam FB, and therefore, it is crucial that the design thickness of the composite flexbeam FB be precisely controlled during manufacture thereof so that the composite flexbeam FB exhibits the required dynamic response characteristics. The most significant factor in achieving the design thickness of the composite flexbeam FB is maintaining repeatable high tolerance thickness consistency, i.e., approximately ±0.0254 centimeters (±0.010 inches), over the radial span $S_s$ of the composite flexbeam FB during the manufacturing process. While the method and apparatus of the present invention are described herein in terms of controlling the thickness of a helicopter composite flexbeam during the manufacture thereof, one skilled in the art will appreciate that the method and apparatus of the present invention has utility in the manufacture of a wide variety of composite articles wherein the design thickness must be precisely controlled.

Referring now to the drawings wherein like reference numerals identify corresponding or similar elements throughout the several views, FIG. 1 is a schematic diagram illustrating the steps of a method 10 according to the present invention for controlling thickness during the lay-up and fabrication of press-cured composite articles. As illustrated in FIG. 1, the method 10 according to the present invention includes a preparatory stage 12 and a fabrication stage 28. The preparatory stage 12 comprises preparatory process steps 14–26 wherein unidirectional prepreg plies and supplemental ply-packs are layed up in a preparatory molding assembly and subjected to vacuum and autoclave compaction cycles to form the final laminate package that defines the configuration of the composite article to be manufactured. The prepreg plies and supplemental ply-packs layed up in the preparatory stage have been precut and formed, respectively, to conform to the final net shape of the composite article, but include a predetermined overbuild in the width dimension to facilitate control of thickness during cure of the final laminate package. The fabrication stage 28 comprises fabrication process steps 30–40 wherein a deformable, back-pressure system is abutted in combination with the final laminate package, and the resulting combination is prepared for curing in a fabrication molding assembly and then subjected to a cure cycle in a heated platen press to form the cured composite article. The cured composite article is machined to net shape in the width dimension to form the finished composite article.

The preparatory and fabrication stages 12, 28 of the method 10 of the present invention are designed for use with a matched metal molding assembly. For the described embodiment of the present invention (which is a development manufacturing process as opposed to a production manufacturing process), the components comprising the matched metal molding assembly, as described hereinbelow in further detail, are fabricated from a tool steel for cost and performance reasons. Tool steel is a relatively inexpensive mold material which has a coefficient of thermal expansion that is compatible with the coefficient of thermal expansion of prepreg plies formed with fiberglass reinforcing fibers (prepreg plies with fiberglass reinforcing fibers comprise approximately 75% of the hybrid composite flexbeam FB described in U.S. Pat. No. 5,431,538). One skilled in the art will appreciate that, depending upon the composition of the prepreg plies used in the practice of the method 10 of the present invention, other materials may be used to fabricate the components comprising the matched metal molding assembly.

For example, INVAR®, a trademarked material that is an iron-nickel alloy containing 40–50% nickel and characterized by an extremely low coefficient of thermal expansion, is projected to be used to fabricate the components comprising the matched metal molding assembly for use in the method 10 according to the present invention for full scale production of composite flexbeams FB. Interestingly, for manufacturing production of composite flexbeams FB, it has been determined that the coefficient of thermal expansion of the prepreg plies formed with graphite reinforcing fibers, even though such graphite prepreg plies comprise only 25% of the composite flexbeam FB, is the determinative factor in mold material selection. The coefficient of thermal expansion of graphite prepreg plies matches the coefficient of thermal expansion of INVAR® material such that the components comprising the matched metal molding assembly for the production development process for manufacturing the composite flexbeam FB will be fabricated from INVAR® material.

Figure 3A:
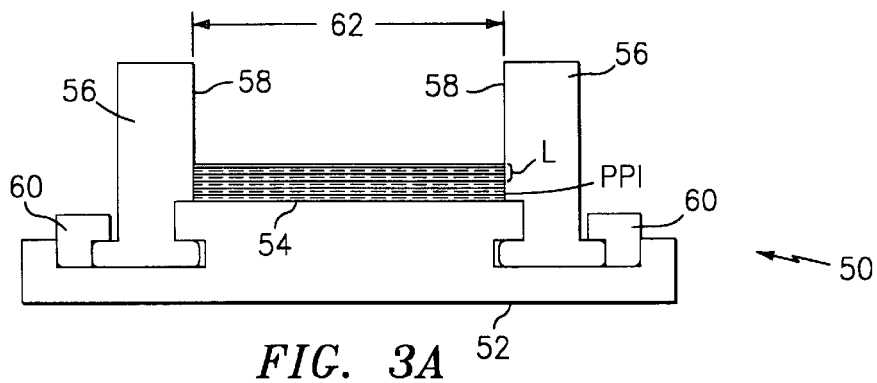
FIG. 3A illustrates a preparatory molding assembly for use in the method of the present invention, the preparatory molding assembly having prepreg plies forming a laminate layed-up therein.

In a first step 14, a preparatory molding assembly 50 for use in the preparatory stage 12 of the method 10 according to the present invention is assembled. With reference to FIG. 3A, the preparatory molding assembly 50 comprises a base mold member 52 having a molding surface 54, opposed removable lay-up rails 56 having definition surfaces 58, and retention blocks 60. The molding surface 54 has a configuration that defines one outer mold line surface of the composite article to be manufactured, e.g., either the upper or lower surface of the composite flexbeam FB. As one skilled in the art will appreciate, the molding surface 54 may have a variety of configurations, depending upon the outer mold line surfaces that define the configuration of the composite article to be manufactured. With the opposed side rails 56 mounted in combination with the base mold member 52, the retention blocks 60 are assembled in abutting engagement with the opposed side rails 56 and the base mold member 52. The retention blocks 60 are operative to maintain the opposed side rails 56 in immovable combination with respect to the base mold member 52. The definition surfaces 58 of the opposed side rails 56 as mounted in immovable combination with the base mold member 52 define the edge configuration, i.e., the width dimension, of the prepreg plies (as well as the supplemental ply-packs) to be layed up during the preparatory stage 12 of the method 10.

The inventor has determined that it is preferable to overbuild the composite article to be manufactured in the width dimension, i.e., the edge configuration or periphery of the final laminate package produced during the preparatory stage 12 of the method 10 has a greater width dimension than the net edge configuration of the finished composite article. The width overbuild provides a machining allowance so that the cured composite article may be machined to the net edge configuration, i.e., the design width dimension. In addition, the width overbuild is the portion of the final laminate package that interacts with the deformable, back-pressure system when the final laminate package is subjected to the cure cycle in the fabrication stage 28. Any degradation to the final laminate package as a result of interaction with the deformable, back-pressure system during the cure cycle is incurred by the width overbuild, which is subsequently removed during machining in the fabrication stage 28, such that structural and functional characteristics of the finished composite article are not affected by movement of the final laminate package during the cure cycle.

With respect to FIG. 2A, reference character "$W_{RS}$" defines the width dimension of the composite flexbeam FB at a specific radial station (radial station as used herein defines any cross-sectional position along the radial span $S_R$ with respect to the root end of the composite flexbeam FB). With respect to overbuild in the width dimension, there are two approaches. In the first approach, each edge of the composite flexbeam FB, i.e.. leading edge and trailing edge, is overbuilt by a predetermined value "X" at each radial station along the radial span $S_R$ of the composite flexbeam FB, i.e., the width overbuild at any radial station equals $X+W_{RS}+X$. In the first approach, therefore, the overbuilt periphery or edge configuration of the final laminate package mirrors the net edge configuration or periphery of the finished composite flexbeam FB, but has a larger width dimension, i.e., the width overbuild.

In the second approach, the leading and trailing edges of the composite flexbeam FB at the radial station where the composite flexbeam FB has a maximum width $W_{MAX}$ are overbuilt by a predetermined value "X" and the remainder of the edge configuration of the composite flexbeam FB is overbuilt so that the width overbuild at any radial station equals $X+W_{MAX}+X$. In the second approach, therefore, the overbuilt periphery or edge configuration of the final laminate package is a rectangular configuration. The second approach facilitates the automation of the ply lay-up step 16 as described hereinbelow in further detail.

The embodiment of the method 10 described herein utilizes the first approach such that, with reference to FIG. 3A, the spacing 62 between the definition surfaces 58 at any radial station is equal to $X+W_{RS}+X$. For the described embodiment, the width overbuild (X+X) is quantified as approximately 5% of the design width of the composite flexbeam FB, i.e., the predetermined value X would have a magnitude of about 2.5% of the design width since the composite flexbeam FB has leading and trailing edges. For the composite flexbeam FB described in the '538 patent, each edge is overbuilt by approximately 0.635 centimeters (0.25 inches), i.e., the width overbuild is approximately 1.27 centimeters (0.5 inches).

In step 16, a plurality of prepreg plies PPI are individually layed up, either manually or automatically (the method 10 according to the present invention is suitable for either manual or automated lay-up of individual prepreg plies PPI), onto the molding surface 54 of the base mold member 52 to define a laminate L (see FIG. 3A). The number of individual prepreg plies PPI layed up to define the laminate L in step 16 depends on the nominal certified cured thickness(es) of the prepreg plies PPI being layed up and the configuration of the composite article being fabricated. Typically, an operational process plan regulates the lay-up of prepreg plies, i.e., both the number and the relative positioning of prepreg plies PPI.

The total number of prepreg plies PPI required in the preparatory stage 12 to form the final laminate package, which has a thickness greater than the design thickness of the composite flexbeam FB, is based upon the nominal certified cured thickness(es) of the prepreg sheets or tapes from which the prepreg plies PPI are cut as described hereinabove, and foreknowledge of the resultant cured thickness of such prepreg plies PPI in comparison to the nominal thickness of the raw prepreg plies PPI as layed-up and compacted (debulked) during the process steps 14–26 of the preparatory stage 12. The operational process plan comprises a plurality of sequence sheets wherein each sequence sheet specifies the lay-up sequence and number of prepreg plies to be layed-up before step 18 is implemented. The number of prepreg plies PPI that may be layed up in step 16 is limited due to air that is entrained (entrained is used herein to differentiate this phenomenon from the air that is entrapped in the prepreg sheets or tapes during manufacture thereof) between layed-up prepreg plies PPI during ply lay-up, i.e., as each subsequent prepreg ply is layed up onto a layed-up prepreg ply, air is entrained therebetween. As the number of layed-up prepreg plies increases, the volume of entrained air concomitantly increases, and the greater the volume of entrained air, the more inherently unstable the laminate L is.

Through experimentation and experience, the number of prepreg plies that can be effectively layed up in each step 16 without experiencing adverse effects from the air entrained between the overlaid prepreg plies PPI is generally known. The particular number for a given application, or even for a particular sequence sheet, depends, inter alia, on the composition of the prepreg plies, the nominal certified cured thickness of the individual prepreg plies, and the relative positioning of the prepreg plies. Pragmatically, the number of prepreg plies PPI may be quantified in terms of a maximum thickness of the laminate defined by the layed-up prepreg plies. That is, individual prepreg plies PPI are sequentially layed up until the laminate L has a maximum thickness at a defined radial station. For the fabrication of the described composite flexbeam FB by means of the method 10, prepreg plies PPI are layed up until the laminate L has a maximum thickness of approximately 0.264 centimeters (about 0.104 inches) in the hub attachment region of the composite flexbeam FB. This maximum thickness is based upon the lay-up of prepreg plies PPI wherein each ply PPI has a nominal certified cured thickness of about 0.015 centimeters ±0.00127 centimeters (0.006 inches ±0.0005 inches).

After the plurality of prepreg plies PPI have been layed up in step 16, the preparatory molding assembly 50 is vacuum bagged and subjected to a room temperature vacuum compaction cycle in step 18. Techniques for vacuum bagging the preparatory molding assembly 50 and subjecting the vacuum-bagged preparatory molding assembly 50 to a room temperature vacuum compaction cycle are known to those skilled in the art. The vacuum compaction cycle removes most of the air entrained within the laminate L formed in step 16 as described in the preceding paragraphs to stabilize the laminate L. In addition, the vacuum compaction cycle provides some quantum of debulking of the laminate. For the described embodiment of the composite flexbeam FB manufactured by the method 10, the preparatory molding assembly 50 is subjected to vacuum compaction at room temperature for at least thirty minutes.

Figure 3B:
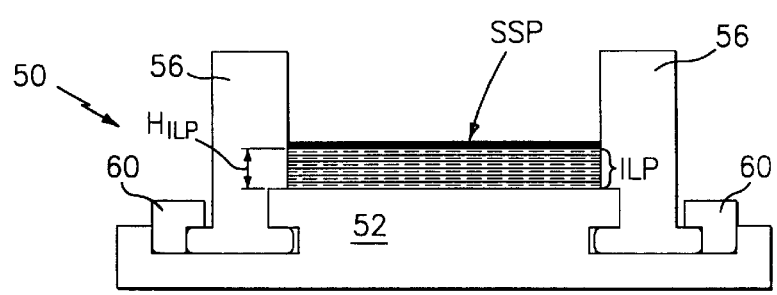
FIG. 3B illustrates the intermediate laminate package with supplemental ply-packs layed up in combination therewith formed during the preparatory stage of the method according to the present invention.

At step 20, steps 16 and 18 are sequentially repeated to form another laminate L that overlays the layed-up laminate L in the preparatory molding assembly 50. Step 20 is repeated as required until the plurality of laminates L layed up in the preparatory molding assembly 50 form an intermediate laminate package ILP (see FIG. 3B). The intermediate laminate package ILP is defined as the juncture in the preparatory stage 12 wherein slightly less than one-half of the total number of prepreg plies PPI specified by the operation process plan have been layed up in the preparatory molding assembly 50. Pragmatically, prepreg plies PPI are layed up into the preparatory molding assembly 50 until just prior to mid-plane or neutral axis of the composite article to be manufactured is reached. For the described embodiment of the composite flexbeam FB manufactured by the method 10, the juncture wherein slightly less than 400+ prepreg plies PPI have been layed up in the preparatory molding assembly 50, i.e., to just prior to mid-plane or neutral axis of the composite flexbeam FB.

After the intermediate laminate package ILP has been formed in the preparatory molding assembly 50, the preparatory molding assembly 50 is vacuum bagged and subjected to an autoclave compaction cycle in step 22. Techniques for vacuum bagging the preparatory molding assembly 50 and subjecting the vacuum-bagged preparatory molding assembly 50 to an autoclave compaction cycle are known to those skilled in the art. During autoclave compaction, the vacuum-bagged preparatory molding assembly 50 is subjected to an autoclave compaction temperature $T_{ac}$ and compaction pressure $P_{ac}$ for a predetermined compaction period. The compaction temperature $T_{ac}$, compaction pressure $P_{ac}$, and compaction period depend, inter alia, on the material composition of the prepreg plies PPI, in particular, the organic resin thereof, the number of prepreg plies PPI comprising the intermediate laminate package ILP, and the configuration of the intermediate laminate package ILP. For the described embodiment of the composite flexbeam FB manufactured by the method 10 according to the present invention, the vacuum-bagged preparatory molding assembly 50 is subjected to an autoclave compaction temperature $T_{ac}$ of about 26.7° C. (80° F.) and a compaction pressure $P_{ac}$ of about $6.89 \times 10^5$ N/m² (100 PSI) for a compaction period of at least one hour.

The autoclave compaction cycle is operative to: (i) remove any unevenness in the layed-up prepreg plies PPI forming the intermediate laminate package ILP, i.e., to provide a further quantum of debulking for the intermediate laminate package ILP: (ii) remove entrapped air from the layed-up prepreg plies PPI; and (iii) induce a small resin flow in the layed-up prepreg plies PPI to effectuate consolidation of such layed-up prepreg plies PPI forming the intermediate laminate package ILP. Prior to the autoclave compaction cycle, the layed-up prepreg plies PPI forming the intermediate laminate package ILP are inherently unstable and subject to uncontrolled movement. Consolidation stabilizes the layed-up prepreg plies PPI forming the intermediate laminate package ILP, thereby effectively eliminating uncontrolled movement of the layed-up prepreg plies PPI forming the intermediate laminate package ILP during subsequent processing in the preparatory stage 12.

At step 24, the height of the autoclave-compacted intermediate laminate package ILP is measured (see reference character $H_{ILP}$ in FIG. 3B), preferably at a radial station that represents the maximum thickness of the composite article to be manufactured. For the described embodiment of the composite flexbeam FB as manufactured by the method 10 of the present invention, the measurement is taken in the hub attachment region and/or torque tube attachment region of the composite flexbeam FB as these regions represent the maximum thickness of the composite flexbeam FB. The actual height $H_{ILP}$ of the intermediate laminate package ILP is compared to the specification height of the intermediate laminate package ILP to ascertain the gross variation in thickness of the intermediate laminate package ILP as a result of individual thickness variations of the layed-up prepreg plies PPI forming the intermediate laminate package ILP. As used herein, the specification height of the intermediate laminate package ILP is defined as the sum of the nominal certified cured thicknesses of the prepreg plies PPI that have been layed up to form the intermediate laminate package ILP plus a percentage of bulk (to account for the fact that the layed-up prepreg plies PPI forming the intermediate laminate package ILP have actual thicknesses that are greater than the nominal certified cured thicknesses).

It will be appreciated that magnitude of the gross variation in thickness, as determined by the procedure described in the preceding paragraph, needs to be adjusted, i.e., the adjusted gross variation in thickness, to account for the further variation in gross thickness that will be incurred in step 26 wherein the remaining prepreg plies PPI are layed up in the preparatory molding assembly 50 to form the final laminate package.

The adjusted gross variation in thickness determines the number and type of supplemental ply-packs (see reference characters SPP in FIG. 3B) to be incorporated in combination with the intermediate laminate package ILP in step 24. The supplemental ply packs SPP provide compensation for up to 12.5% in thickness variations in the final laminate package based upon the measured height of the intermediate laminate package ILP in step 24 and function as one of the process controls implemented in the preparatory stage 12 (as noted above, and as discussed hereinbelow in further detail, the fabrication stage 28 of the method 10 can compensate for variations in thickness of approximately 5%).

A set of supplemental ply-packs SPP is prefabricated by laying up a plurality of prepreg plies having a peripheral configuration that is congruent with the mid-plane or neutral axis configuration of the composite article to be fabricated, e.g., the mid-plane or neutral axis configuration of the composite flexbeam FB, to form individual supplemental ply-packs SSP. The peripheral configuration of each supplemental ply-pack SSP includes the width overbuild discussed hereinabove.

Each individual supplemental ply-pack SPP has a spanwise thickness distribution ratio that is equal to the spanwise thickness distribution ratio of the composite article to be manufactured. For example, the composite flexbeam FB has a spanwise thickness distribution ratio of approximately 8.3:1 so that each supplemental ply-pack SPP of the set would likewise have an equivalent spanwise thickness distribution ratio of approximately 8.3:1. If the composite article to be manufactured has a constant thickness in the spanwise direction, the spanwise thickness distribution ratio would be 1:1. Each of the supplemental ply-packs SPP of the set, however, has an absolute thickness at any given radial station that is dissimilar to the absolute thicknesses of the other supplemental ply-packs SPP of the set at the same given radial station. By careful selection of the differences in absolute thickness among the supplemental ply-packs SSP comprising the set and the number of supplemental ply-packs SPP comprising the set, the appropriate number of supplemental ply-packs SPP can be readily selected from the set and incorporated in combination with the intermediate laminate package ILP in step 24 (see FIG. 3B) to compensate for the adjusted gross variation in thickness. It will be appreciated that the adjusted gross variation in step 24 may be such that no supplemental ply-packs SSP have to be layed up in combination with the intermediate laminate package ILP. Therefore, it should be appreciated that the "number" of supplemental ply-packs SSP layed up in step 24 can include zero. The supplemental ply-packs SSP, as incorporated in combination with the intermediate laminate package ILP in step 24, are approximately centered about the mid-plane or neutral axis of the composite article being manufactured, i.e., extend above and below the mid-plane axis in approximately equal proportions.

Each supplemental ply-pack SPP is further fabricated to have a material distribution or ratio of different types of prepreg plies that is consonant with the prepreg ply PPI ratio at the mid-plane of the composite article to be fabricated so that the material and structural design properties of the composite article to be manufactured, e.g., material modulus, structure stiffness and frequency, fiber volume, remains unchanged. For the described embodiment of the composite flexbeam FB manufactured by means of the method 10, the mid-plane or neutral axis thereof and the immediately adjacent regions embody only fiberglass prepreg plies. Therefore, the set of supplemental ply-packs SSP for the composite flexbeam FB is comprised only by fiberglass prepreg plies, and the fiber orientation of such fiberglass prepreg plies is predominantly 0°, with a minimum number of fiberglass prepreg plies having fiber orientations of +45° and −45° to provide stability in the individual supplemental ply-packs SSP.

Figure 3C:
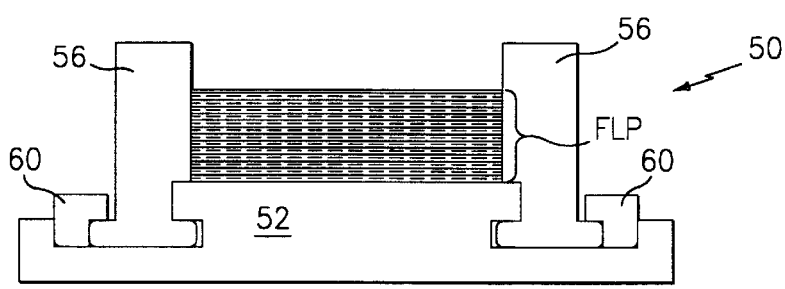
FIG. 3C illustrates the final laminate package formed during the preparatory stage of the method according to the present invention.

In step 26, steps 16 and 18 as described hereinabove are repeated until all of the remaining prepreg plies PPI specified in the operations process plan have been layed up in the preparatory molding assembly 50 and vacuum compacted to form a final laminate package (see reference character FLP in FIG. 3C). At this point, step 22 is repeated to subject the final laminate package FLP to the autoclave compaction cycle described hereinabove to provide an autoclave-compacted final laminate package FLP as the product of the fabrication stage 28 of the method 10. This completes the preparatory stage 12 of the method 10 according to the present invention.

If the composite article to be manufactured is sufficiently thin, i.e., the nominal overbuild thickness may be achieved by the lay-up in step 16 of a single plurality of prepreg plies PPI to form the final laminate package FLP, it will be appreciated that steps 18, 20, 22, 24, and 26 may be eliminated in the preparatory stage 12.

Figure 3D:
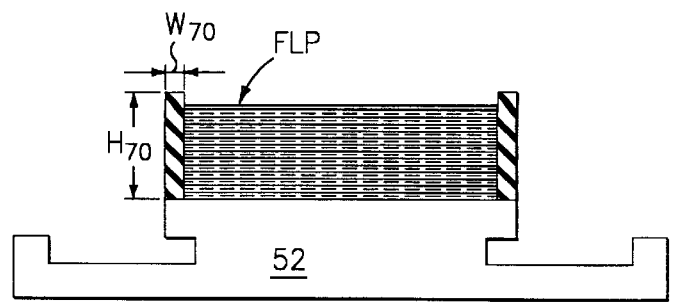
FIG. 3D illustrates the deformable, back-pressure system abutted in combination with the edges of the final laminate package.

In the first step 30 of the fabrication stage 28, the preparatory molding assembly 50 is disassembled by disassembling the retention blocks 60 and removing the lay-up guide rails 58 to expose the autoclave-compacted final laminate package FLP layed up on the base mold member 52 as illustrated in FIG. 3D. Next, in step 32 a deformable, back-pressure system 70 is abutted in combination with the lateral edges and the ends of the autoclave-compacted final laminate package FLP as described hereinbelow in further detail.

Alternatively, if the deformable, back-pressure system 70 has sufficient structural integrity, the deformable, back-pressure system 70 could be installed at step 14 of the preparatory stage 12, thereby eliminating the need for steps 30, 32 and 34 of the fabrication stage 28. A barrier material such as FEP fluoropeel cloth may be interposed between the final laminate package FLP and the deformable, back-pressure system 70 as required.

The deformable, back-pressure system 70 is operative to provide process thickness control during the fabrication stage 28 of the method 10. The deformable, back-pressure system 70 deforms in a controlled manner during the cure cycle to control and limit the lateral, i.e., edgewise, movement of the final laminate package FLP (the longitudinal movement of the final laminate package FLP is likewise controlled and limited, but such longitudinal movement does not pose the same degree of concern as does lateral movement). The deformable, back-pressure system 70 also prevents lateral (as well as longitudinal,) fiber wash-out during the cure cycle. Fiber washout as used herein refers to the phenomenon of uncontrolled movement of the reinforcement fibers of the final laminate package FLP around the force-applying matched mold member (see reference numeral 90 in FIG. 3F) as the final laminate package FLP is subjected to the cure cycle in step 36 of the fabrication stage 28 of the method 10. The controlled deformation of the deformable, back-pressure system 70 also prevents the growth of entrapped air in the prepreg plies PPI forming the final laminate package FLP such that the cured composite article has a low void content.

As used herein, the deformable back-pressure system 70 is defined as any material, structure, or device that possesses the following characteristics. First, the material, structure, or device must have the capability to deform in a repeatable manner under the elevated pressure and temperature conditions associated with the cure of the autoclave-compacted final laminate package FLP during the step 36 cure cycle. For the described embodiment of the composite flexbeam FB manufactured by the method 10, a maximum cure temperature of approximately 185° C. (365° F.) and a maximum cure force exerted by the heated platen press within the range of approximately 711,712 N–889,640 N (160,000–200,00 pounds). Second, the material, structure, or device must have a capability to exert a back pressure while experiencing controlled deformation. The exerted back-pressure must high enough to inhibit the growth of entrapped air in the autoclave-compacted final laminate package FLP during the cure cycle of step 36, but, concomitantly, the exerted back-pressure must not be so high as to preclude the controlled deformation of the deformable, back-pressure system 70. And lastly, the material, structure, or device must be stable, i.e., no decomposition or breakdown, at the elevated temperatures associated with the cure cycle of step 36.

Representative examples of suitable materials that will provide the defined characteristics of the deformable back-pressure system 70 include closed cell thermoplastic foam materials such as polymethylacrylimide or polyetherimide, closed cell thermoset materials such as isocyanurates or polyurethanes, uncured syntactic type foams, cured low density syntactic type foams, foamed elastomers or rubbers, or deformable natural type materials such as balsa wood. Representative examples of suitable structures and devices that will provide the defined characteristics of the deformable back-pressure system 70 include a rubber, elastomer, silicone rubber, or fluoroelastomer bladder having a pressure regulation and control system (internal pressure medium may be gaseous or liquid), a sealed rubber, elastomer, silicone rubber, or fluoroelastomer bladder with a compressible internal medium, a metallic honeycomb with side-loaded cell structure, a spring-loaded mechanical resistance device (leaf, belleville washer, coil), or a hollow structure fabricated of material that is stressed within its elastic limits. For the preferred embodiment of the method 10 according to the present invention, the deformable, back-pressure system 70 installed in combination with the autoclave-compacted final laminate package FLP in step 32 is ROHACELL® (ROHACELL is a registered trademark of Rohm Tech Inc. for an polymethylacrylimide foam that experiences up to a 12% expansion in volume upon heating).

The deformable, back-pressure system 70 in the form of a ROHACELL® block is inserted along each edge of the autoclave-compacted final laminate package FLP as shown in FIG. 3D to control and limit the lateral movement of the width overbuild of the autoclave-compacted final laminate package FLP and to prevent lateral fiber washout during the fabrication stage 28. In addition, a deformable back-pressure system 70 in the form of ROHACELL® blocks may also be inserted at each end of the base mold member 52 (not shown) to control and limit the longitudinal movement of the autoclave-compacted final laminate package FLP and to prevent longitudinal fiber washout during the fabrication stage 28. The requisite width $W_{70}$ for the deformable, back-pressure system 70 is based upon the total width of the final laminate package FLP, and preferably, the requisite width $W_{70}$ is approximately 5% of the total width of the final laminate package FLP.

For the described embodiment of the composite flexbeam FB manufactured by the method 10, 110 WF grade ROHACELL® blocks having a width $W_{70}$ of approximately 1.27 centimeters (0.50 inches) and a height $H_{70}$ od approximately 0.64 centimeters (0.25 inches) greater than the nominal thickness $T_{FLP}$ (see FIG. 3F) of the autoclave-compacted final laminate package FLP are installed along the edges of the autoclave-compacted final laminate package FLP. In a similar manner, ROHACELL® blocks having a width (in this context a dimensional length in the spanwise direction) of approximately 3.81 centimeters (1.50 inches) and a height approximately 0.64 centimeters (0.25 inches) higher than the thickness of the autoclave-compacted final laminate package FLP are installed at the ends of the autoclave-compacted final laminate package FLP.

Figure 3E:
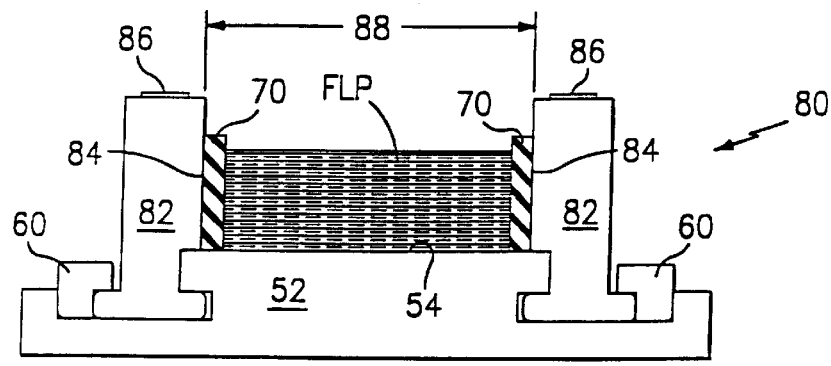
FIGS. 3E, 3F illustrate a fabrication molding assembly for use in the method of the present invention.

In step 34, the base mold member 52 is reconfigured to form a fabrication molding assembly 80 wherein the autoclave-compacted final laminate package FLP layed up in the base mold member 52 can be cured to form the cured composite flexbeam FB. With reference to FIG. 3E, the fabrication molding assembly 80 comprises the base mold member 52, opposed, removable cure side rails 82 having definition surfaces 84, and the retention blocks 60. Each cure side rail 82 preferably includes a plurality of stop buttons 86 spaced along the free edge thereof. With the opposed cure rails 82 mounted in combination with the base mold member 52, the retention blocks 60 are inserted in abutting engagement with the opposed cure rails 82 and the base mold member 52. For the fabrication molding assembly 80, the retention blocks 60 are operative to maintain the opposed cure rails 82 in immovable combination with respect to the base mold member 52. The opposed cure rails 82 in combination define a spacing 88 therebetween that accommodates the width overbuild of the autoclave-compacted final laminate package FLP, i.e., $X+W_{RS}+X$ for the described embodiment of the method 10, and the width $W_{70}$ of the deformable, back-pressure system 70 installed along each edge of the autoclave-compacted final laminate package FLP in step 32.

Figure 3F:
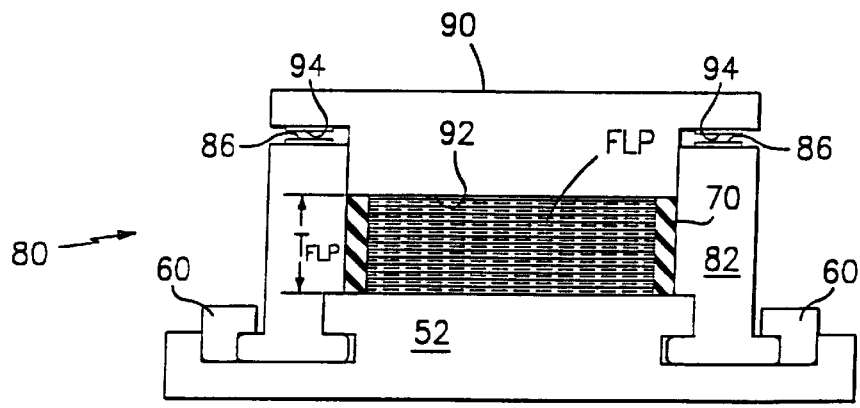

The fabrication molding assembly 80 further comprises a force-applying matched mold member 90 having a molding surface 92 and, preferably, complementary stop buttons 94 disposed along the edges thereof (see FIG. 3F). The molding surface 92 defines the other outer mold line surface of the composite article to be manufactured, e.g., either the lower or upper surface of the composite flexbeam FB. The force-applying matched mold member 90 is assembled in combination with base mold member 52. In assembled combination, the complementary stop buttons 94 of the forcer-applying matched mold member 90 are aligned with the stop buttons 86 of the base mold member 52.

Figure 3G:
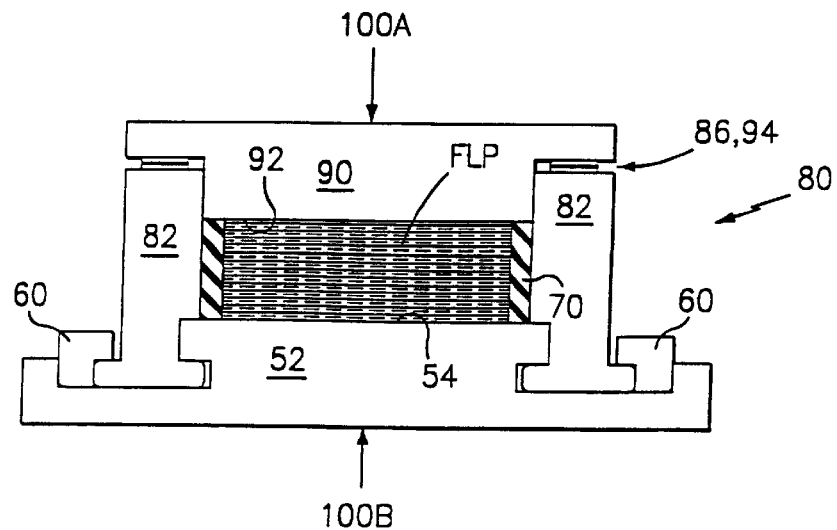
FIG. 3G illustrates the fabrication molding assembly in the fully closed position as the result of a full closure force exerted by the heated platen press.

Once the fabrication molding assembly 80 has been assembled, the cure cycle is implemented in step 36 by installing the fabrication molding assembly 80 in combination with a heated platen press (for purposes of simplification, the heated platen press is schematically represented by arrows 100A, 100B in FIG. 3G wherein arrow 100B represents the stationary base of the heated platen press and arrow 100A represents the movable force-exerting member of the heated platen press) and the heated platen press 100A is initially closed at a nominal closure force $F_{cl}$ to the position illustrated in FIG. 3F wherein the molding surface 92 physically abuts the surface of the autoclave-compacted final laminate package FLP (it should be noted that the nominal closure force $F_{cl}$ does not effect closure of the fabrication molding assembly 80, and that only a minimal pressure is exerted against the autoclave-compacted final laminate package FLP). For the described embodiment of the composite flexbeam FB manufactured by the method 10, the nominal closure force $F_{cl}$ is about 177,928 N (40,000 lbs). Subsequently, the heated platen press 100A, 100B is operated to subject the fabrication molding assembly 80 to a cure cycle of elevated force(s) and temperature(s) to cure the autoclave-compacted final laminate package FLP layed up in the fabrication molding assembly 80 to form the cured composite flexbeam FB.

Figure 4A:
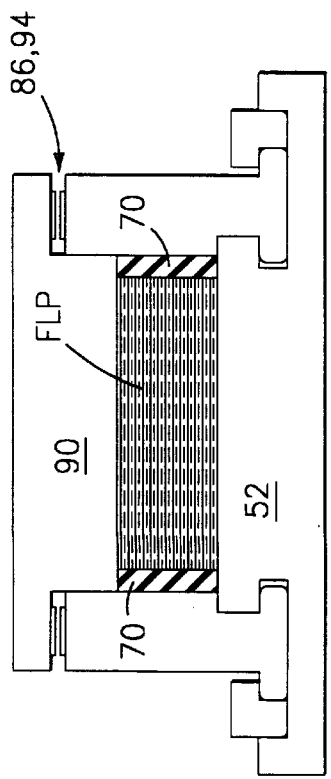
FIG. 4A illustrates the initial configuration of the fabrication molding assembly for the condition wherein the final laminate package has a minimal thickness variation.
Figure 5A:
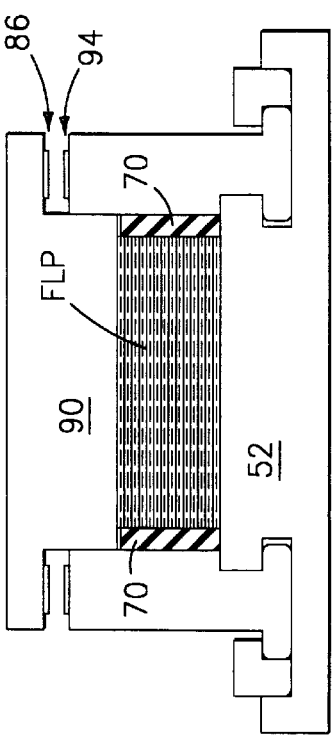
FIG. 5A illustrates the initial configuration of fabrication molding assembly for the condition wherein the final laminate package has a maximal thickness variation.

An examination of FIG. 3F reveals that when the nominal closure force $F_{cl}$ exerted by the heated platen press causes the molding surface 92 to physically abut the surface of the autoclave-compacted final laminate package FLP, the aligned stop buttons 86, 94, respectively, are spatially separated. This phenomenon occurs because the preparatory stage 12 of the method 10 according to the present invention is designed to form an autoclave-compacted final laminate package FLP wherein the nominal overbuild thickness $T_{FLP}$ of the autoclave-compacted final laminate package FLP is greater than the design thickness of the cured composite article. Due to variations in thickness of the raw prepreg plies PPI that are layed up and compacted in the preparatory stage 12 of the method 10 of the present invention to form the autoclave-compacted final laminate package FLP, the nominal overbuild thickness $T_{FLP}$ of the autoclave-compacted final laminate package FLP is variable throughout a range from a minimum overbuild thickness to a maximum overbuild thickness. FIG. 4A schematically illustrates the minimum overbuild thickness of the autoclave-compacted final laminate package FLP and FIG. 5A schematically illustrates the maximum overbuild thickness of the autoclave-compacted final laminate package FLP. It will be appreciated that all autoclave-compacted final laminate packages FLP formed during the preparatory stage 12 of the method 10 according to the present invention will have an overbuild thickness within such range, and, therefore, can be effectively cured in step 36 to form a cured composite article that meets or exceeds the demanding tolerance specifications delimited for the design thickness of a composite article to be manufactured, e.g., the composite flexbeam FB.

Figure 4B:
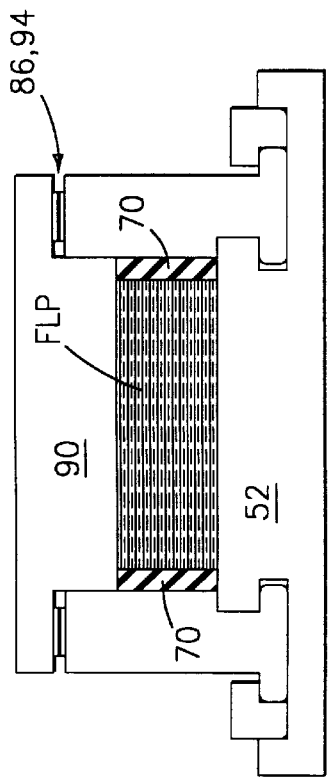
FIG. 4B illustrates the final configuration of the fabrication molding assembly of FIG. 4A after cure of the final laminate package having the minimal thickness deviation.
Figure 5B:
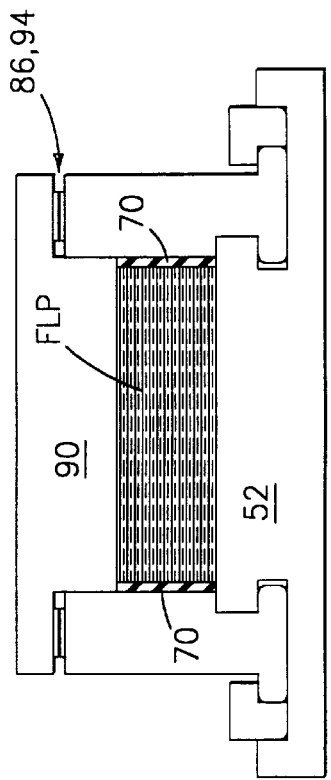
FIG. 5B illustrates the final configuration of the fabrication molding assembly of FIG. 5A after cure of the final laminate package having the maximal thickness variation.

FIGS. 4B and 5B are counterparts of FIGS. 4A and 5A, respectively, illustrating the fabrication molding assembly 80 in the fully closed position as result of a full closure force exerted by the heated platen press 100A wherein a defined cure pressure is exerted against the autoclave-compacted final laminate package FLP to effect cure thereof. In the fully closed position, the aligned stop buttons 86, 94 are in abutting engagement. The abutting engagement of the aligned stop buttons 86, 94 defines a predetermined spatial separation between the molding surfaces 54, 92 wherein such predetermined spatial separation is the design thickness of the composite article being manufactured. The use of abutting engagement between the stop buttons 86, 94 to define the fully closed position of the fabrication molding assembly 80 is to ensure full closure of the fabrication molding assembly 80 as required. Without the stop buttons, there is a small probability that foreign objects could accumulate on the upper edges of the cure rails 82, and that such foreign objects would preclude the fabrication molding assembly 80 from achieving the fully closed position.

A comparison of FIGS. 4B and 5B shows that the deformable, back-pressure system 70 is subjected to a greater controlled deformation in the circumstance wherein the autoclave-compacted final laminate package FLP embodies the maximum overbuild thickness (FIG. 5A) than in the circumstance wherein the autoclave-compacted final laminate package FLP embodies the minimum thickness overbuild (FIG. 4A).

The parameters of the cure cycle implemented in step 36 of the fabrication stage 28 of the method 10 depend upon the complexity of the configuration of the composite article to be manufactured, the overall dimensions, i.e., length, width, and thickness, of the autoclave-compacted final laminate package FLP, and the organic resin(s) embodied in the prepreg plies PPI that are layed up to form the final laminate package FLP. The cure cycle may be a single stage cure cycle comprising a single elevated temperature and single elevated pressure, or a multi-stage cure cycle comprising two or more elevated temperatures and two or more elevated pressures, or even combinations thereof, i.e., one of the cure parameters, e.g., either temperature or pressure, has a single value while the other parameter, e.g., pressure or temperature, has multiple values. Based upon the factors described hereinabove, one skilled in the art would be able to define an appropriate cure cycle for step 36 of the method 10.

For the described embodiment of the composite flexbeam FB manufactured by the method 10, the cure cycle employed in step 36 is a multistage cure cycle. Such a multi-stage cure cycle ensures that there is complete closure of the fabrication molding assembly 80 prior to full gellation of the resinous matrix of the prepreg plies PPI forming the final laminate package FLP. With respect to the temperature cycle, the temperature is increased from a room temperature of approximately 26.7° C. (80° F.) to approximately 96.1° C. (205° F.) at a rate of approximately 0.56° C./min (1° F./min). The temperature is then maintained at a dwell temperature of approximately 96.1° C. (205° F.) for a period of about four hours. This ensures that the heated platen press 100A, 100B, and concomitantly, the fabrication molding assembly 80, are fully closed and the resinous matrix of the prepreg plies PPI forming the final laminate package FLP is sufficiently gelled. The dwell period also prevents an uncontrolled exothermic reaction as the temperature is increased to a final cure temperature.

Next, the temperature is raised from the dwell temperature of approximately 96.1° C. (205° F.) to a final cure temperature of approximately 185° C. (365° F.) at a rate of approximately 0.56° C./min (1° F./min). The final cure temperature of about 185° C. (365° F.) is maintained for a minimum of two hours to achieve full cure of the final laminate package FLP. After the final laminate package FLP is fully cured, i.e., the cured composite flexbeam FB, the temperature is reduced from the final cure temperature of approximately 185° C. (365° F.) to approximately 65.6° C. (150° F.) at a rate of approximately 1.16° C./min (2° F./min) to minimize the effect of thermal strain on the cured composite flexbeam FB as it cools.

Concomitantly, the heated platen press 100A, 100B is maintained at the nominal closure force $F_{cl}$ of approximately 177,928 N (40,000 lbs) until the final laminate package FLP reaches a minimum temperature of approximately 76.7° C. (170° F.). Upon reaching this minimum temperature, the resinous matrix of the prepreg plies PPI forming the final laminate package FLP is sufficiently soft so that the final laminate package FLP will move. At this point, the pressure exerted by the heated platen press 100A is slowly increased from the nominal closure force $F_{cl}$ to a cure force $Fc_u$ having a value within the range of approximately 711,712 N–889,640 N (160,000 lbs–200,000 lbs) at a rate that causes full closure of the fabrication molding assembly 80 at an exerted force within the range of approximately 533,784 N–622,748 N (120,000 lbs–140,000 lbs). The heated platen press 100A is maintained at the cure force $F_{cu}$ having a value within the range of approximately 711,712 N–889,640 N (160,000 lbs–200,000 lbs) until the cure cycle is completed.

When the final laminate package FLP reaches the minimum temperature wherein the organic resin achieves a viscosity that allows movement of the final laminate package FLP, the force exerted by the heated platen press 100 is increased from the nominal closure force $F_{Cl}$ to a cure force $F_{Cu}$. These set of conditions cause full closure of the force-applying matched mold member 90 in combination with the base mold member 52 and concomitantly causes lateral movement of the final laminate package FLP against the deformable, back-pressure system 70. As the curing force applied by the heated platen press is gradually increased, the decrease in the overbuild thickness of the final laminate package FLP (due to the movement of the force-applying match mold member 90) is transformed into lateral movement of the width overbuild such that the width overbuild of the final laminate package FLP exerts a correspondingly greater force against the deformable, back-pressure system 70, which is correspondingly deformed to a greater degree, which in turn causes a greater back-pressure to be exerted by the deformable, back-pressure system 70 against the width overbuild of the final laminate package FLP. This corresponding increase in back-pressure tends to counteract the lateral expansion of the width overbuild of the final laminate package FLP. These interactions between the final laminate package FLP and the deformable, back-pressure system 70 control and limit the lateral movement of the final laminate package FLP during the fabrication stage 28 of the method 10 according to the present invention.

In step 38, the fabrication molding assembly 80 is disassembled by removing the force-applying matched mold member 90 from the base mold member 52, disassembling the retention blocks 60, and removing the opposed cure rails 82 so that the cured composite flexbeam FB can be removed from the base mold member 52. The cured composite flexbeam FB is then subjected to machining operations in step 40 to machine excess material from the edges of the cured composite flexbeam FB to form the machined composite flexbeam FB that embodies the thickness design dimension.

A variety of modifications and variations of the present invention are possible in light of the above teachings. For example, the method of the present invention was described herein in terms of controlling the thickness of a press-cured composite article. It will be appreciated that the method described hereinabove may also be used to control the width or length dimension of a composite article (assuming the reinforcement fibers of the laminates comprising such a composite article have suitable fiber orientation(s) to be manufactured by suitably modifying the appropriate process steps described hereinabove. It is therefore to be understood that, within the scope of the appended claims, the present invention may be practiced otherwise than as specifically described hereinabove.

What is claimed Is:

1. A reconfigurable molding assembly for use in a method for controlling thickness during lay-up and fabrication of a composite article, the method including a preparatory stage and a fabrication stage, comprising:
   a preparatory molding assembly for forming an autoclave-compacted final laminate package during the preparatory stage that constitutes the composite article to be manufactured, said preparatory molding assembly including
      a base mold member having a molding surface that defines one outer mold line surface of the autoclave-compacted final laminate package,
      opposed, removable lay-up rails having definition surfaces mounted in combination with said base mold member, and
      retention blocks inserted in abutting engagement with said opposed, removable lay-up rails and said base mold member to maintain said opposed, removable lay-up rails in immovable combination with respect to said base mold member wherein the spacing between said definition surfaces of said opposed, removable lay-up rails defines an overbuild width of the autoclave-compacted final laminate package;
   wherein said preparatory molding assembly is reconfigured after formation of the autoclave-compacted final laminate package by disassembling said retention blocks and removing said opposed, removable lay-up rails in preparation for the fabrication stage; and
   a fabrication molding assembly for forming the composite article from the autoclave-compacted final laminate package during the fabrication stage, said fabrication molding assembly comprising
      said base mold member having the autoclave-compacted final laminate package layed-up thereon,
      a deformable back-pressure system abutted in combination with each lateral edge of the autoclave-compacted final laminate package,
      opposed, removable cure rails mounted in combination with said base mold member in abutting engagement with said deformable back-pressure system,
      retention blocks inserted in combination with said opposed, removable cure rails and said base mold member to maintain said opposed, removable cure rails in immovable combination with respect to said base mold member wherein the spacing between said opposed, removable cure rails defines the overbuild width of the autoclave-compacted final laminate package plus the width of the deformable back-pressure system disposed along each lateral edge of the autoclave-compacted final laminate package, and
      means for applying a cure force to the autoclave-cured final laminate package.

2. The reconfigurable molding assembly of claim 1 wherein said cure force applying means of said fabrication molding assembly comprises a matched mold member having a molding surface assembled in combination with said base mold member, said molding surface defining an outer mold line surface of the composite article to be fabricated.

3. The reconfigurable molding assembly of claim 2 wherein
   said opposed, removable cure rails have a plurality of stop buttons disposed on the free edges thereof; and
   said matched mold member has a plurality of complementary stop buttons.

4. The reconfigurable molding assembly of claim 1 wherein said retention blocks inserted in combination with said opposed, removable cure rails and said base mold member of said fabrication molding assembly are said retention blocks inserted in combination with said opposed, removable lay-up rails and said base mold member of said preparatory molding assembly.

5. The reconfigurable molding assembly of claim 1 wherein said deformable back-pressure system is abutted in combination with each lateral edge of the autoclave-compacted final laminate package and the ends of the autoclave-compacted final laminate package.

6. The reconfigurable molding assembly of claim 1 wherein said deformable back-pressure system abutted in combination with each lateral edge of the autoclave-compacted final laminate package comprises a block of Rohacell abutted in combination with each lateral edge of the autoclave-compacted final laminate package.

7. The reconfigurable molding assembly of claim 6 wherein each Rohacell block has a requisite width that is approximately five percent of the overbuild width of the autoclave-compacted final laminate package .

* * * * *